(12) United States Patent
Kitamura et al.

(10) Patent No.: US 9,145,658 B2
(45) Date of Patent: Sep. 29, 2015

(54) HYBRID WORK MACHINE AND CONTROL METHOD OF PROVIDING INFORMATION FOR THE SAME

(71) Applicant: Komatsu Ltd., Tokyo (JP)

(72) Inventors: Kenichi Kitamura, Kanagawa (JP); Kentaro Murakami, Kanagawa (JP)

(73) Assignee: Komatsu Ltd., Minato-ku, Tokyo (JP)

(\*) Notice: Subject to any disclaimer, the term of this patent is extended or adjusted under 35 U.S.C. 154(b) by 0 days.

(21) Appl. No.: 14/352,776

(22) PCT Filed: Jul. 23, 2013

(86) PCT No.: PCT/JP2013/069948
§ 371 (c)(1),
(2) Date: Apr. 18, 2014

(87) PCT Pub. No.: WO2015/011788
PCT Pub. Date: Jan. 29, 2015

(65) Prior Publication Data
US 2015/0046004 A1    Feb. 12, 2015

(51) Int. Cl.
| | |
|---|---|
| E02F 9/20 | (2006.01) |
| B60S 5/00 | (2006.01) |
| B60W 10/06 | (2006.01) |
| B60W 10/26 | (2006.01) |
| B60W 20/00 | (2006.01) |
| E02F 9/26 | (2006.01) |

(Continued)

(52) U.S. Cl.
CPC ............... *E02F 9/2091* (2013.01); *B60S 5/00* (2013.01); *B60W 10/06* (2013.01); *B60W 10/26* (2013.01); *B60W 20/50* (2013.01); *E02F 9/2075* (2013.01); *E02F 9/2292* (2013.01); *E02F 9/2296* (2013.01); *E02F 9/26* (2013.01); *H02J 1/00* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,332,108 | B1 * | 12/2001 | Hirasago | 701/93 |
| 8,805,608 | B2 * | 8/2014 | Matsumoto et al. | 701/104 |
| 2013/0057305 | A1 * | 3/2013 | Jimbo | 324/750.01 |

(Continued)

FOREIGN PATENT DOCUMENTS

| | | |
|---|---|---|
| JP | H09-308131 A | 11/1997 |
| JP | 2001-128385 A | 5/2001 |

(Continued)

OTHER PUBLICATIONS

International Search Report dated Sep. 24, 2013 from International Application No. PCT/JP2013/069948, 3 pages.

*Primary Examiner* — Thomas Tarcza
*Assistant Examiner* — Richard Goldman
(74) *Attorney, Agent, or Firm* — Fish & Richardson P.C.

(57) ABSTRACT

A hybrid hydraulic excavator includes: an engine; a generator motor; an electric storage device; a commanding system being configured to command at least activation of a service mode for maintenance and execution of a charge-release process for the electric storage device; a display being configured to provide at least information on the charge-release process for the electric storage device; and a display controller being configured to control displaying of the display. The display controller commands the display to display charge-release-failure information when the charge-release process is ongoing at the elapse of a predetermined duration of time since the activation of the service mode was commanded.

6 Claims, 8 Drawing Sheets

(51) Int. Cl.
*E02F 9/22* (2006.01)
*H02J 1/00* (2006.01)

(56) References Cited

U.S. PATENT DOCUMENTS

| | | | | |
|---|---|---|---|---|
| 2013/0090835 A1* | 4/2013 | Take et al. | | 701/103 |
| 2013/0106356 A1* | 5/2013 | Nakao et al. | | 320/118 |
| 2014/0081561 A1* | 3/2014 | Be et al. | | 701/112 |
| 2014/0214250 A1* | 7/2014 | Murakami et al. | | 701/22 |
| 2014/0278019 A1* | 9/2014 | Be et al. | | 701/112 |
| 2015/0032314 A1* | 1/2015 | Kitamura | | 701/22 |
| 2015/0046004 A1* | 2/2015 | Kitamura et al. | | 701/22 |

FOREIGN PATENT DOCUMENTS

| | | |
|---|---|---|
| JP | 2011-242344 A | 12/2011 |
| JP | 2012-10563 A | 1/2012 |

\* cited by examiner

HYBRID WORK MACHINE AND CONTROL METHOD OF PROVIDING INFORMATION FOR THE SAME

CROSS-REFERENCE TO RELATED APPLICATIONS

This application claims priority to International Application No. PCT/JP2013/069948 filed on Jul. 23, 2013, the contents of which application are incorporated herein by reference in its entirety.

TECHNICAL FIELD

The present invention relates to a hybrid work machine equipped with an electric storage device and a control method of providing information for the hybrid work machine.

BACKGROUND ART

As a work machine, there has been known a hybrid work machine such as an excavator in which an engine drives a generator motor and a hydraulic pump, whereby an electric motor for an upper rotary body, in which a cab and the like are provided, is driven by electric power generated by the generator motor while a hydraulic actuator for a working equipment and a hydraulic motor for a traveling device are driven by a pressure oil from the hydraulic pump. The electric power generated by the generator motor is charged in a capacitor serving as an electric storage device and is outputted from the capacitor to the electric motor through an inverter.

In some hybrid work machines, charge release of an electric storage device (i.e., capacitor) is performed before measurement of the capacitance of the electric storage device (see, for instance, Patent Literature 1). According to Patent Literature 1, prior to capacitance measurement, charge release (discharge) of the capacitor is preferably performed to reduce a capacitor voltage to a preset level for the purpose of comparison with previous measurement data.

Further, for capacitance measurement, an engine is typically driven and a work mode is set at a power mode or the like, thereby driving the engine and a generator motor at a stable speed to stably generate electric power and thus to stably and accurately measure the capacitance.

CITATION LIST

Patent Literature(S)

Patent Literature 1: JP-A-2011-242344

SUMMARY OF THE INVENTION

Problem(S) to be Solved by the Invention

According to Patent Literature 1, charge release is, however, performed merely for the purpose of equalizing initial conditions for capacitance measurement. Actually, Patent Literature 1 describes that charge release is not always required. Patent Literature 1 is thus silent about a process for the case where charge release cannot be performed.

In contrast, for electric storage devices in some hybrid work machines, charge release is performed not only for capacitance measurement as described above but also for maintenance. This is because when residual charge exists in an electric storage device, hybrid devices such as the electric storage device, a generator motor and an electric motor cannot be replaced or checked. Accordingly, in such hybrid work machines, when a maintenance worker sets a service mode for maintenance, a charge-release process is available for execution.

Further, in some hybrid work machines, the service mode is automatically terminated at the elapse of a predetermined duration of time since activation of the service mode. For instance, in order to reduce fuel consumption, some hybrid work machines employ an auto-idle-stop mechanism (ATS mechanism) that stops an engine when the machine is not in operation. However, when the auto-idle-stop mechanism is employed, idling is not automatically stopped with the service mode being activated and thus the engine is continuously driven. Accordingly, it has been required that the service mode is canceled and forcibly changed to a normal mode at the elapse of a predetermined duration of time from transition to the service mode so that idling is automatically stopped to reduce fuel consumption.

However, when the engine is stopped as a result of auto idle stop or the like, the generator motor cannot be activated, and thus a charge-release process for the electric storage device, which requires the activation of the generator motor, cannot be performed. As a result, the charge-release process is sometimes discontinued and thus ends in failure.

Similarly, when no auto-idle-stop function is provided, the service mode may also be automatically canceled at the elapse of a predetermined duration of time from transition to the service mode so as not to leave the service mode activated for a long time. The cancellation of the service mode may result in tidlure in the charge-release process due to discontinuance thereof.

However, it has not been considered to provide information on failure in the charge-release process or the like to a maintenance worker or the like, so that maintenance is sometimes improperly performed.

An object of the invention is to provide a hybrid work machine capable of providing information on a charge-release process to an operator and a control method of providing information for the hybrid work machine.

Means for Solving the Problems

According to a first aspect of the invention, a hybrid work machine includes: an engine; a generator motor; an electric storage device being configured to store electric power generated by the generator motor; a commanding system being configured to command at least activation of a service mode for maintenance and execution of a charge-release process for the electric storage device; an information-providing device being configured to provide at least information on the charge-release process for the electric storage device; and an information-providing controller being configured to control the information-providing device to provide the information, the information-providing controller commanding the information-providing device to provide the information when the charge-release process is ongoing at an elapse of a predetermined duration of time since the activation of the service mode was commanded by the commanding system.

In the above aspect, when the commanding system commands activation of the service mode and then commands execution of the charge-release process under the service mode upon request of a maintenance worker or the like, the charge-release process is started. The information-providing controller commands the information-providing device to provide the information when the charge-release process is ongoing at the elapse of the predetermined duration of time from the start of the service mode. When the information-providing device is provided by a display, the information on the charge-release process is shown by the display. With this arrangement, the maintenance worker is informed that the charge-release process is not completed at the elapse of the predetermined duration of time.

In this manner, in case that the service mode is afterwards cancelled and forcibly changed to a normal state and the charge-release process is then discontinued as a result of stop of the engine after satisfaction of activation conditions for auto idle stop, the maintenance worker can be precautioned by providing the information at the elapse of the predetermined duration of time. The maintenance worker can thus prepare for discontinuance of the charge-release process during maintenance of the electric storage device or a device to which electric power is supplied from the electric storage device. As a result, the maintenance worker can appropriately prepare for an actual failure in the charge-release process due to engine stop.

In the first aspect, it is preferable that the hybrid work machine further include an auto-stop controller being configured to control auto-stop of the engine, in which the auto-stop controller commands the auto-stop of the engine when a preset auto-stop condition is satisfied at the elapse of the predetermined duration of time since the activation of the service mode was commanded by the commanding system, and the information-providing controller commands the information-providing device: to provide the information including charge-release-failure information when the charge-release process is ongoing at the elapse of the predetermined duration of time since the activation of the service mode was commanded by the commanding system; and to continuously provide the charge-release-failure information even when the charge-release process is completed before the auto-stop of the engine is started.

According to the above arrangement, the charge-release-failure information is provided at the elapse of the predetermined duration of time from the start of the service mode. In this case, while the charge-release-failure information is provided by the information-providing device, the charge-release process can be continued as long as the engine is driven. Therefore, as long as the activation conditions for auto idle stop are satisfied after a while, the charge-release process may be completed before the activation conditions are satisfied.

Even in such a case, since the charge-release-failure information has been tentatively provided, even when the charge release actually ends in success, a maintenance worker is cautioned with the continuously provided charge-release-failure information, thereby further enhancing safety in maintenance. In short, the charge-release-failure information is favorably provided to caution the maintenance worker at the elapse of the predetermined duration of time. If charge-release-success information were provided in place of the charge-release-failure information when the charge release afterwards ends in success, the maintenance worker would be confused. In contrast, according to the above arrangement, the charge-release-failure information is provided even when the charge release afterwards ends in success, so that the maintenance worker is prevented from being confused.

In the first aspect, it is preferable that the hybrid work machine further include an auto-stop controller being configured to control auto-stop of the engine, in which the auto-stop controller commands the auto-stop of the engine when a preset auto-stop condition is satisfied at the elapse of the predetermined duration of time since the activation of the service mode was commanded by the commanding system, and the information-providing controller commands the information-providing device: to provide the information including charge-release-normal-completion information when the charge-release process is completed before the elapse of the predetermined duration of time since the activation of the service mode was commanded by the commanding system; and to continuously provide the charge-release-normal-completion information after the predetermined duration of time elapses and the auto-stop of the engine is started.

According to the above arrangement, when the charge-release process is completed before the elapse of the predetermined duration of time from the start of the service mode, the charge-release-normal-completion information is immediately provided. Further, even after the elapse of the predetermined duration of time or the automatic stop of the engine, the charge-release-normal-completion information is continuously provided. In other words, when the charge-release process is performed, a maintenance worker can reliably be informed of the state of charge release by continuously providing the information on the result of the charge-release process even when the process is normally completed. Therefore, the maintenance worker can be cautioned, thereby further enhancing safety in maintenance.

In the first aspect, it is preferable that the hybrid work machine further include an auto-stop controller being configured to control auto-stop of the engine, in which the auto-stop controller commands the auto-stop of the engine when a preset auto-stop condition is satisfied at the elapse of the predetermined duration of time since the activation of the service mode was commanded by the commanding system, and the information-providing controller commands the information-providing device: to provide the information including charge-release-failure information when the charge-release process ends in failure before the elapse of the predetermined duration of time since the activation of the service mode was commanded by the commanding system; and to continuously provide the charge-release-failure information after the predetermined duration of time elapses and the auto-stop of the engine is started.

According to the above arrangement, when the charge-release process ends in failure before the elapse of the predetermined duration of time from the start of the service mode, the charge-release-failure information is immediately provided. Further, even after the elapse of the predetermined duration of time or the automatic stop of the engine, the charge-release-failure information is continuously provided. In other words, even when the charge-release process is discontinued and ends in failure, the information on the result of the charge-release process is continuously provided, thereby reliably informing a maintenance worker of the state of charge release by continuously providing the information on the result of the charge-release process. Therefore, the maintenance worker can be cautioned, thereby further enhancing safety in maintenance.

According to a second aspect of the invention, a control method of providing information for a hybrid work machine, the hybrid work machine including: a generator motor, an electric storage device being configured to store electric power generated by the generator motor; a commanding system being configured to command at least activation of a service mode for maintenance and execution of a charge-release process for the electric storage device; and an information-providing device being configured to provide at least information on the charge-release process for the electric storage device, the method includes commanding the information-providing device to provide the information when the charge-release process is ongoing at an elapse of a predetermined duration of time since the activation of the service mode was commanded by the commanding system.

Likewise, in the second aspect, the information-providing device provides the information when the charge-release process is ongoing at the elapse of the predetermined duration of time from the start of the service mode. In this manner, a maintenance worker can be cautioned. The maintenance worker can thus prepare for discontinuance of the charge-release process during maintenance of the electric storage derive or a device to which electric power is supplied from the electric storage device. As a result, the maintenance worker can appropriately prepare for an actual failure in the charge-release process due to engine stop.

In the second aspect, it is preferable that the control method of providing the information for the hybrid work machine further include: commanding auto-stop of the engine when a preset auto-stop condition is satisfied at the elapse of the predetermined duration of time since the activation of the service mode was commanded by the commanding system; and commanding the information-providing device: to provide the information including charge-release-failure information when the charge-release process is ongoing at the elapse of the predetermined duration of time since the activation of the service mode was commanded by the commanding system; and to continuously provide the charge-release-failure information even when the charge-release process is completed before the auto-stop of the engine is started.

Likewise, according to the above amendment, since the charge-release-failure information has been tentatively provided, even when the charge release actually ends in success, a maintenance worker is cautioned with the continuously provided charge-release-failure information, thereby further enhancing safety in maintenance.

DESCRIPTION OF EMBODIMENT(S)

Figure 1:
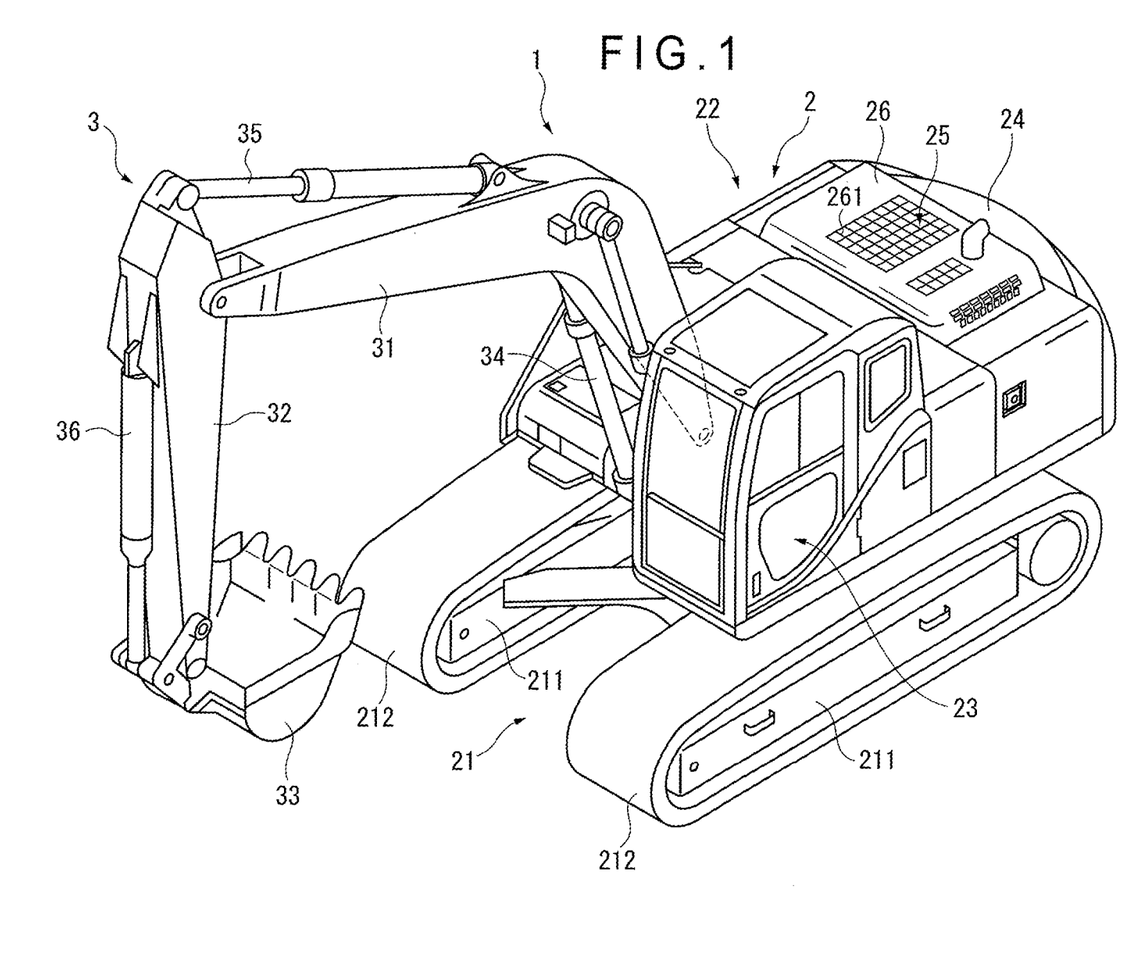
FIG. 1 is a perspective view of a hybrid hydraulic excavator according to an exemplary embodiment of the invention.

Exemplary embodiment(s) of the invention will be described below with reference to the attached drawings.
Description on Hydraulic Excavator as a Whole
FIG. 1 shows a hybrid hydraulic excavator 1 as a hybrid work machine according to the exemplary embodiment. The hybrid hydraulic excavator 1 includes a vehicle body 2 and working equipment 3.
Vehicle Body
The vehicle body 2 includes a carrier 21 and a rotary body 22 rotatably provided on the carrier 21. The carrier 21 includes a pair of traveling devices 211. The respective traveling devices 211 are provided with crawler belts 212. Laterally described hydraulic motors 213R, 213L drive the crawler belts 212, whereby the hybrid hydraulic excavator 1 travels.
Rotary Body
The rotary body 22 includes a cab 23, a counterweight 24 and an engine compartment 25. The counterweight 24 is provided for weight balance with the working equipment 3 and is filled with weights. An engine hood 26 covering the engine compartment 25 has a grid-like opening 261. A cooling air from the outside is taken into the engine compartment 25 through the opening 261.
Working Equipment
The working equipment 3 is attached to a front center of the rotary body 22 and includes a boom 31, an arm 32, a bucket 33, a boom cylinder 34, an arm cylinder 35 and a bucket cylinder 36. The boom 31, the arm 32, the bucket 33 and the rotary body 22 are actuated in response to a tilting operation on right and left working equipment levers provided on the right and left of an operator seat, respectively. A base end of the boom 31 is rotatably connected to the rotary body 22. A distal end of the boom 31 is rotatably connected to a base end of the arm 32. A distal end of the arm 32 is rotatably connected to the bucket 33.

The boom cylinder 34, the arm cylinder 35 and the bucket cylinder 36 are hydraulic cylinders driven by hydraulic oil discharged from hydraulic pumps 6. The boom cylinder 34 actuates the boom 31. The arm cylinder 35 actuates the arm 32. The bucket cylinder 36 actuates the bucket 33.
Arrangement of Driving System for Hybrid Hydraulic Excavator
FIG. 2 shows an overall structure of a driving system for the hybrid hydraulic excavator 1.

Figure 2:
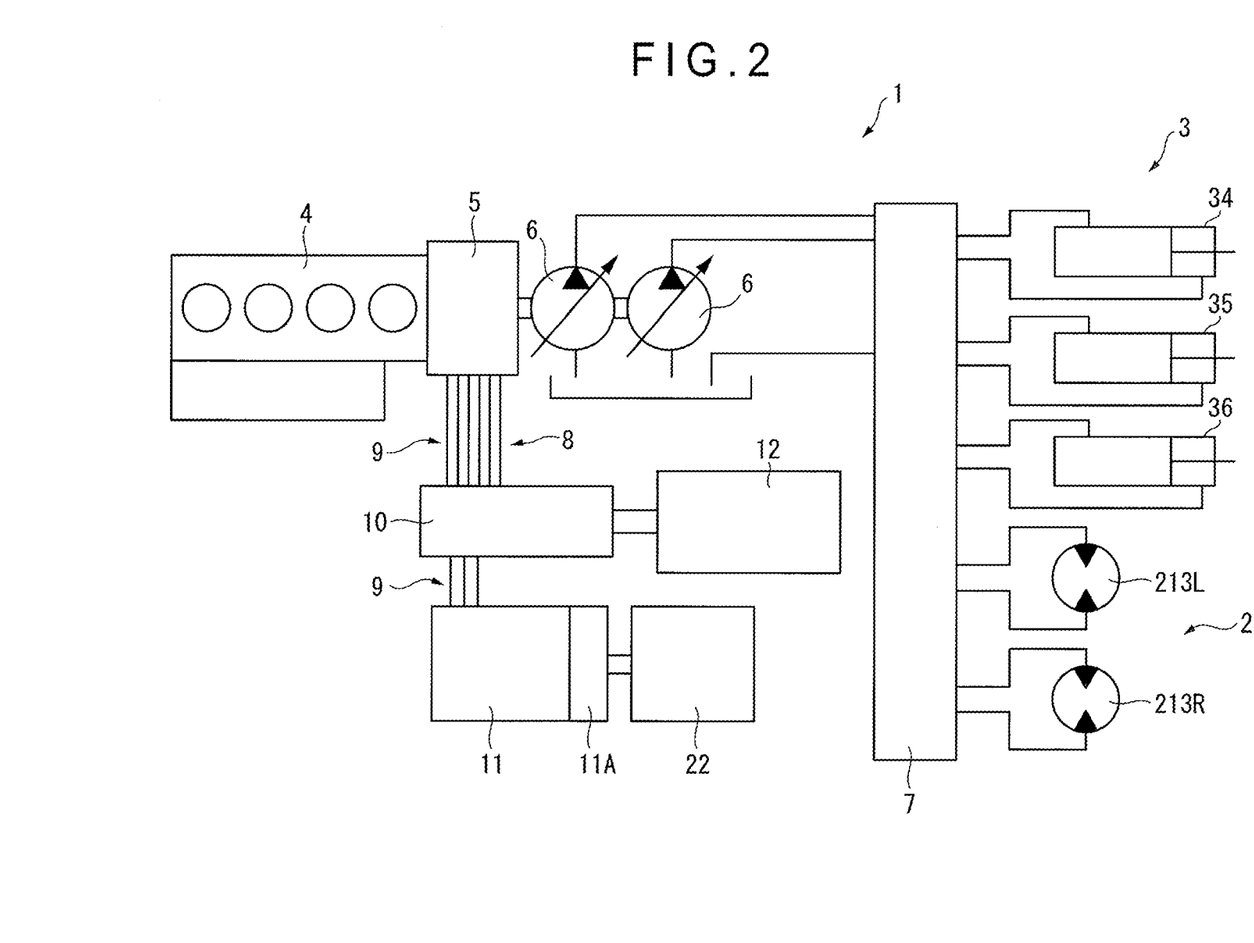
FIG. 2 shows an overall structure of a driving system for the hybrid hydraulic excavator.

As shown in FIG. 2, the hybrid hydraulic excavator 1 includes an engine 4 as a driving source. A generator motor 5 and a pair of hydraulic pumps 6, 6 are connected in series to an output shaft of the engine 4 and are driven by the engine 4. The engine 4 and the generator motor 5 may be interconnected via PTO.

The hydraulic oil fed by pressure from the hydraulic pumps 6 is supplied to the working equipment 3 through a control valve 7, whereby the working equipment 3 is hydraulically actuated. The carrier 21 includes the hydraulic motors 213R, 213L for driving sprockets engaged with the right and left crawlers 212. The hydraulic oil from the hydraulic pumps 6 is supplied to the hydraulic motors 213R, 213L through the control valve 7 in response to an operation on a travel lever (not shown) provided in the cab 23.
Arrangement of Hybrid Device
The generator motor 5, which functions as a power generator and as a motor, is provided by, for instance, an SR (Switched Reluctance) motor. A power cable 8.9 is connected to the generator motor 5. Electric power generated by the generator motor 5 is transmitted to a power converter 10 through the power cable 9.

One end of another power cable 9 is connected to the power converter 10 while the other end of the power cable 9 is connected to a rotary-driving electric motor 11 for driving the rotary body 22. The rotary-driving electric motor 11 is provided by, for instance, a PM (Permanent Magnet) motor.

Moreover, a capacitor 12 serving as an electric storage device is connected to the power converter 10 and the electric power generated by the generator motor 5 is stored in the capacitor 12 through the power converter 10. The electric power stored in the capacitor 12 is supplied to the rotary-driving electric motor 11 from the capacitor 12 through the power converter 10 during a rotary operation.

The rotary-driving electric motor 11 drives the rotary body 22, which is rotatably provided on a top of the carrier 21, through a reducer 11A having a planet gear mechanism and the like. A regenerative braking energy generated when the speed of the rotary-driving electric motor 11 is reduced is also stored in the capacitor 12 through the power converter 10. In this manner, the rotary-driving electric motor 11 functions as a rotary-driving generator motor.

The electric power from the capacitor 12 is also supplied to the generator motor 5 as needed, for instance, at the starting-up of the engine 4. In this manner, the generator motor 5 is used as a motor to assist the engine 4.

As described above, compared with a typical hydraulic excavator, the hybrid hydraulic excavator 1 is additionally equipped with hybrid devices such as the generator motor 5, the power converter 10, the rotary-driving electric motor 11 and the capacitor 12.

Incidentally, although only the rotary-driving electric motor 11 is provided as a rotary motor for driving the rotary body 22 in the exemplary embodiment, a hydraulic motor for rotary movement may be further provided in addition to the rotary-driving electric motor 11.

The hybrid devices may include at least the generator motor 5, the power converter 10 and the capacitor 12. In other words, as an actuator to be driven with the electric power stored in the capacitor 12, any actuator may be usable depending on the type and the like of a hybrid work machine in place of the rotary-driving electric motor 11.

Arrangement of Power Converter

Figure 3:
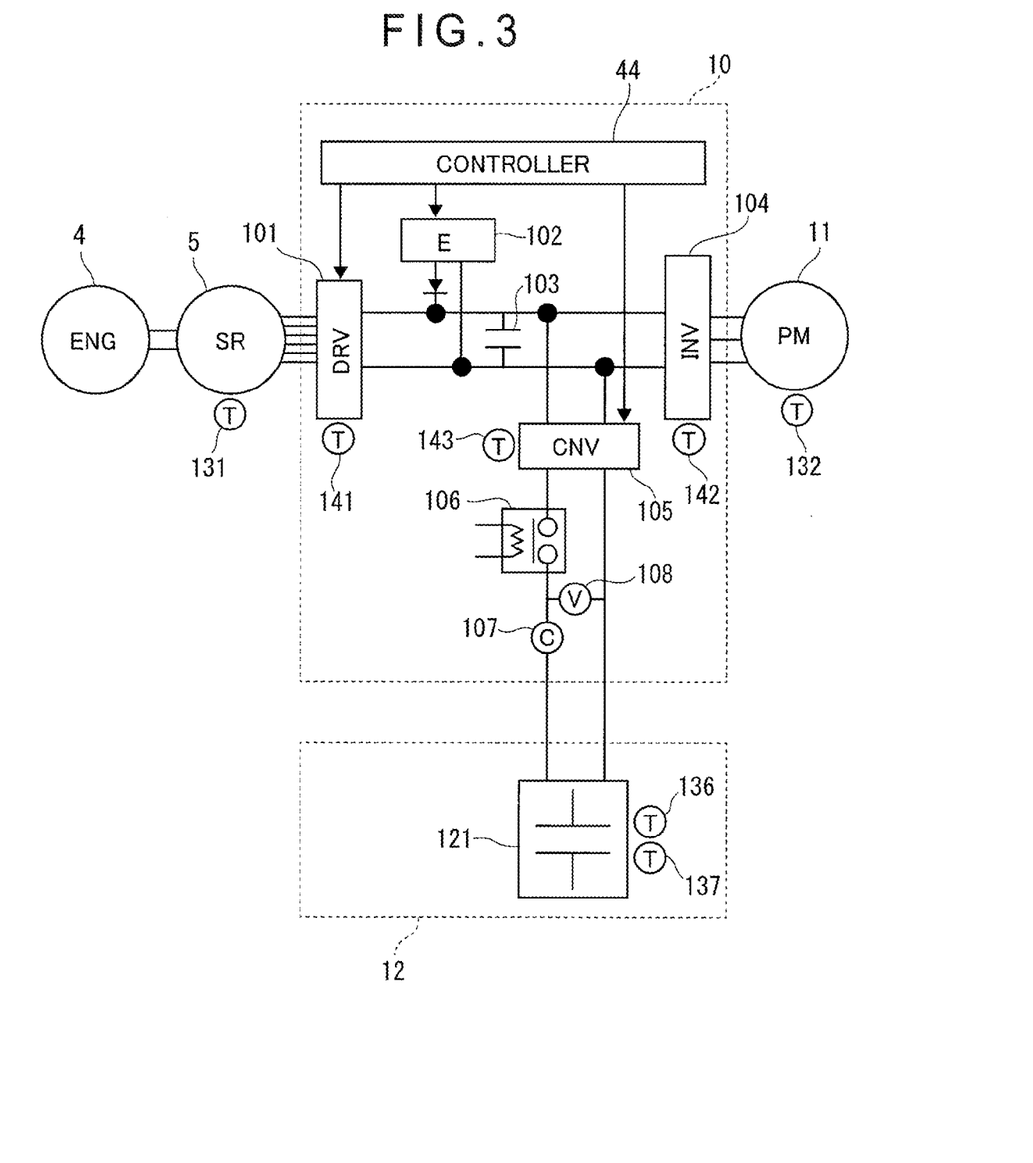
FIG. 3 shows a circuitry of hybrid devices in the hybrid hydraulic excavator.

FIG. 3 shows an internal structure of the power converter 10 and the capacitor 12.

The power converter 10 includes: a driver 101 that converts direct current from the rotary-driving electric motor 11 or the capacitor 12 via an inverter 104 into alternating current and supplies the alternating current to the generator motor 5 to drive the generator motor 5; an excitation power supply 102 that supplies electric current for exciting a coil to start generation of electric power by the generator motor 5; a capacitor 103 for waveform shaping; the inverter 104 that converts direct current from the generator motor 5 or the capacitor 12 into alternating current and supplies the alternating current to the rotary-driving electric motor 11 to drive the rotary-driving electric motor 11; a booster 105 that transforms direct current from each of the inverter 104 and the driver 101 to boost an inter-terminal voltage of the capacitor 12; a contactor 106 provided between the capacitor 12 and the booster 105; an ammeter 107 that detects the electric current of the capacitor 12; a voltmeter 108 that detects the voltage of the capacitor 12; and the hybrid controller 44 that controls the driver 101, the excitation power supply 102 and the booster 105.

The capacitor 12 (i.e., an electric storage device) includes a plurality of capacitor cells 121 and charges/discharges electric power by receiving/transmitting direct current from/to the booster 105. The plurality of capacitor cells 121 are electrically connected to one another in series or in parallel.

Temperature Sensors for Hybrid Devices

As shown in FIG. 3, temperature sensors are provided to measure the temperatures of the hybrid devices. Specifically, the temperature sensors include: a generator-motor-temperature sensor 131 that measures the temperature of the generator motor 5; a rotary-driving-electric-motor-temperature sensor 132 that measures the temperature of the rotary-driving electric motor 11; a power-converter-temperature sensor that measures the temperature of the power converter 10; and electric-storage-device-temperature sensors 136, 137 that measure the temperature of the capacitor 12.

The power-converter-temperature sensor includes: a temperature sensor 141 for the driver 101; a temperature sensor 142 for the inverter 104; and a temperature sensor 143 for the booster 105.

Temperature data obtained from each of these temperature sensors 131, 132, 136, 137, 141, 142 and 143 is sent to the hybrid controller 44.

Arrangement of Control System

Next, description will be made on a control system 40 that controls the hybrid hydraulic excavator 1 with reference to FIG. 4.

Figure 4:
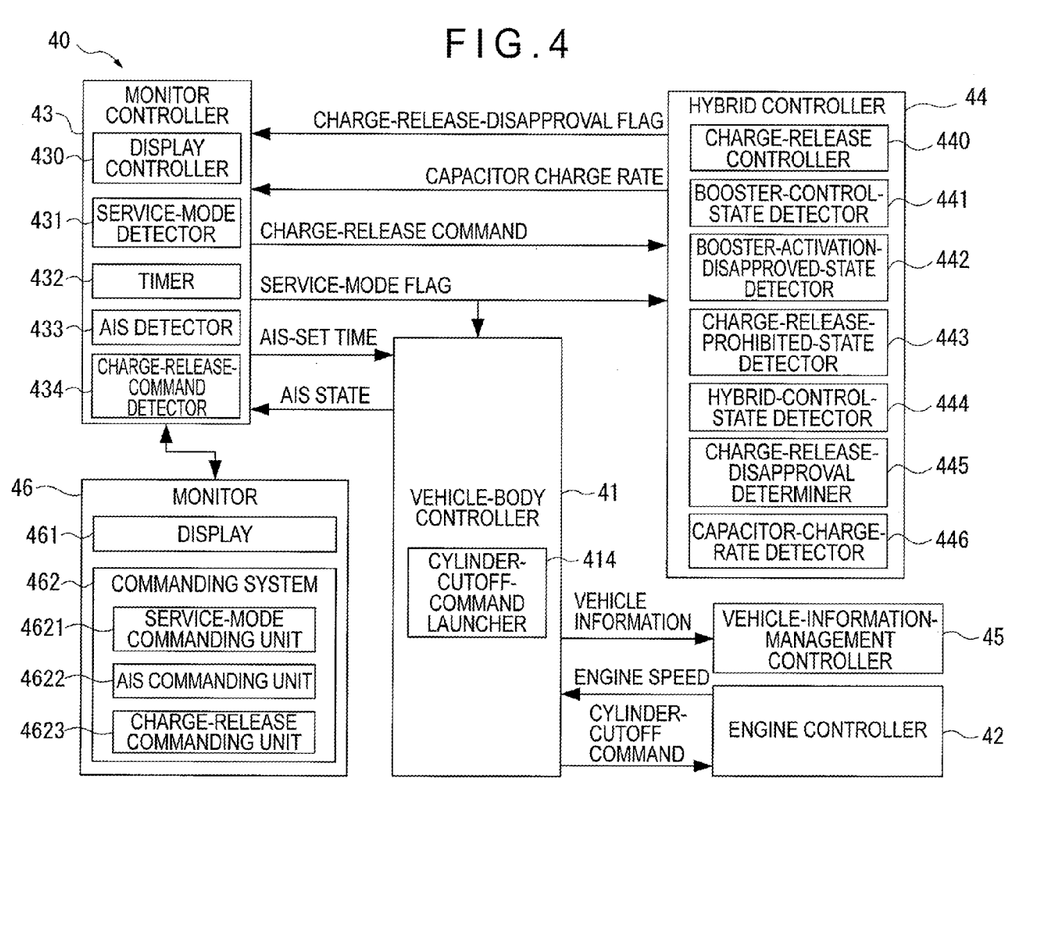
FIG. 4 is a block diagram showing a control system for the hybrid hydraulic excavator.

As shown in FIG. 4, the control system 40 mainly includes a vehicle-body controller 41, an engine controller 42, a monitor controller 43, a hybrid controller 44, a vehicle-information-management controller 45 and a monitor 46. The controllers 41 to 45 are connected through a controller area network (CAN) for mutual data-communication.

Vehicle-Body Controller

The vehicle-body controller 41 (also referred to as a pump controller) is a controller that controls a drive section in the vehicle body (e.g., the inclination angle of a swash plate in each of the hydraulic pumps 6 driven by the engine 4), and is capable of data-communication with the other controllers 42 to 45 via the controller area network.

The vehicle-body controller 41 also determines an AIS (Auto Idle Stop) state depending on conditions for activating AIS and engine-working conditions, and sends the AIS state to the monitor controller 43. For the AIS state in the exemplary embodiment, there are, for instance, four options: a normal state in which AIS is not activated; a "counting up for IS" state set until a predetermined duration of time elapses since the AIS-activating conditions were satisfied; a "commanding IS" state in which a cylinder-cutoff command is outputted to the engine controller 42 at the elapse of the predetermined duration of time; and an "IS activated" state in which the engine 4 is stopped in response to the cylinder-cutoff command.

The vehicle-body controller 41, which outputs the cylinder-cutoff command to the engine controller 42, includes a cylinder-cutoff-command launcher 414 serving as an auto-stop controller that controls auto-stop of the engine 4. The vehicle-body controller 41 also sends vehicle-operation information and the like to the vehicle-information-management controller 45.

Engine Controller

The engine controller 42 is a controller that controls the engine 4 based on, for instance, data obtained by an accelerator-pedal-angle sensor and an engine-speed sensor. The engine controller 42 sends an engine speed (i.e., engine-working conditions) to the vehicle-body controller 41. Thus, the engine controller 42 can determine whether the engine 4 is stopped or driven. The engine controller 42 also sends an engine-water temperature, the regenerated state of a diesel particulate filter, and the like.

Further, in response to the cylinder-cutoff command from the cylinder-cutoff-command launcher 414 of the vehicle-body controller 41, the engine controller 42 stops the engine 4 to stop idling. Incidentally, the cylinder-cutoff-command launcher 414 may be provided to another controller such as the engine controller 42.

Monitor

The monitor 46 includes a display 461 controlled by a display controller 430, and a commanding system 462 provided with a switch used for inputting mode setting or the like. The display 461 is an example of an information-providing device according to the invention.

The display 461 of the monitor 46 switchably displays: a normal image showing vehicle conditions such as an engine-water temperature and a fuel amount; a service image for charge release; and predetermined images related to operations such as setting of AIS, vehicle-body conditions, and the like. The monitor controller 43 and the monitor 46 may be enclosed in the same housing.

Commanding System

The commanding system 462 includes a service-mode commanding unit 4621, an AIS commanding unit 4622 and a charge-release commanding unit 4623.

The service-mode commanding unit 4621 includes a switch operated by a maintenance worker or the like (hereinafter, collectively referred to as a serviceperson) to choose a service mode for maintenance of the vehicle body.

The AIS commanding unit 4622 includes a switch operated by a serviceperson to input an AIS-set time (i.e., a preset time that will elapse before the "counting up for IS" state is changed to the "IS-commanding" state).

The charge-release commanding unit 4623 includes a switch operated by a serviceperson to request execution of the charge-release process.

Incidentally, each of the above commanding units may include a device capable of direct input from a screen (e.g., a touch panel) in place of the switch.

Monitor Controller

The monitor controller 43 controls the operation of the monitor 46 for an operator. The monitor 46 is provided in the cab 23. The monitor controller 43 includes: the display controller 430, a service-mode detector 431, a timer 432, an AIS detector 433 and a charge-release-command detector 434.

Display Controller

The display controller 430 controls the display 461 of the monitor 46. Therefore, upon reception of a notification of detection of execution of the charge-release process from the charge-release-command detector 434, the display controller 430 commands the display 461 to show an image for the state of charge release. The display controller 430 is an example of an information-providing controller.

Service-Mode Detector

The service-mode detector 431 detects that a serviceperson chose the service mode for maintenance of the vehicle body by operating the service-mode commanding unit 4621, and sets a service-mode flag at "1: service mode activated".

Further, upon reception of a notification of the elapse of a service-mode-set time from the timer 432, the service-mode detector 431 sets the service-mode flag at "0: not in service mode".

The service-mode detector 431 then outputs the setting of the service-mode flag to the vehicle-body controller 41 and the hybrid controller 44.

Timer

The timer 432 counts a time elapsed since the service-mode detector 431 set the service-mode flag at "1: service mode activated" (i.e., the start of the service mode). At the elapse of the preset service-mode-set time (e.g., 60 minutes), the timer 432 gives a notification to the service-mode detector 431.

AIS Detector

When the serviceperson sets the AIS-set time by operating the AIS commanding unit 4622, the AIS detector 433 detects the AIS-set time and outputs it to the vehicle-body controller 41. Based on the AIS-set time outputted from the monitor controller 43, the vehicle-body controller 41 determines a preset time that will elapse before the AIS state is changed from the "counting up for IS" state to the "commanding IS" state.

Charge-Release-Command Detector

The charge-release-command detector 434 detects that the serviceperson chose the charge-release process to be performed by operating the charge-release commanding unit 4623 under the service mode. Upon detection of an execution command for the charge-release process (i.e., a charge-release command), the charge-release-command detector 434 gives a notification to the display controller 430 and the hybrid controller 44.

Hybrid Controller

The hybrid controller 44 controls driving of the driver 101, the inverter 104 and the booster 105 that enable transmission/reception of electric power among the generator motor 5, the rotary-driving electric motor 11 and the capacitor 12. In other words, the hybrid controller 44 controls driving of the power converter 10. The hybrid controller 44 further includes a charge-release controller 440 that controls the charge-release process for the capacitor 12, a booster-control-state detector 441, a booster-activation-disapproved-state detector 442, a charge-release-prohibited-state detector 443, a hybrid-control-state detector 444, a charge-release-disapproval determiner 445, and a capacitor-charge-rate detector 446.

Charge-Release Controller

The charge-release controller 440 controls the operation of each of the driver 101 and the booster 105 of the power converter 10, and drives the generator motor 5 with the charge in the capacitor 12, thereby controlling the charge-release (discharge) process for the capacitor 12.

Booster-Control-State Detector

The booster-control-state detector 441 determines whether or not the hybrid controller 44 controls the booster 105 in a capacitor-charge-release-completed state.

Booster-Activation-Disapproved-State Detector

The booster-activation-disapproved-state detector 442 determines whether or not the booster 105 is in an activation-disapproved state. For instance, when the temperature of the booster 105 measured by the temperature sensor 143 exceeds a threshold, it is determined that the booster 105 is in the activation-disapproved state.

Charge-Release-Prohibited-State Detector

The charge-release-prohibited-state detector 443 determines whether or not charge release of the capacitor 12 is to be prohibited.

Hybrid-Control-State Detector

The hybrid-control-state detector 444 determines whether or not the charge-release process for the capacitor 12 is being performed under the control of the charge-release controller 440 on the driver 101 and the booster 105.

Charge-Release-Disapproval Determiner

The charge-release-disapproval determiner 445 determines whether or not charge release is disapproved based on the service-mode flag sent from the detectors 441 to 444 and the service-mode detector 431, and sets a charge-release-disapproval flag. The charge-release-disapproval determiner 445 notifies the monitor controller 43 of the set charge-release-disapproval flag.

Capacitor-Charge-Rate Detector

The capacitor-charge-rate detector 446 detects a charge rate of the capacitor 12 based on measurement data from the voltmeter 108 and the ammeter 107. The capacitor-charge-rate detector 446 notifies the monitor controller 43 of the detected capacitor charge rate.

Vehicle-Information-Management Controller

The vehicle-information-management controller 45 is a device for regularly or irregularly collecting various information on the hybrid hydraulic excavator 1 and sending them to an administrative center. The vehicle-information-management controller 45 is connected to the administrative center for intercommunication via a radio communication network such as communication satellite and mobile communication network. The vehicle-information-management controller 45 can also find a current position by receiving a radio wave from a GPS satellite and send current position information to the administrative center.

Charge-Release-Image Displaying Process

Next, description will be made on a charge-release-image displaying process performed by the monitor controller 43 with reference to flow charts of FIGS. 5 and 6 and image transition diagrams of FIGS. 7 and 8.

The service-mode detector 431 of the control system 40 determines whether or not a serviceperson requests activation of the service mode by operating the service-mode commanding unit 4621 of the commanding system 462 of the monitor 46 (step S1). In the case of "No" in step S1, the service-mode detector 431 repeats the determination process back in step S1.

On the other hand, in the case of "Yes" in step S1, the service-mode detector 431 sets the service-mode flag at "1: service mode activated".

Subsequently, the timer 432 starts counting (measuring) a time elapsed since the service mode was started (i.e., since activation of the service mode was requested) (step S2).

Next, the display controller 430 commands the display 461 to show a menu available in the service mode, and the charge-release-command detector 434 determines whether or not the serviceperson chose the charge-release process from the menu available in the service mode by operating the charge-release commanding unit 4623 of the commanding system 462 (step S3). In the case of "No" in step S3, the charge-release-command detector 434 repeats the determination process back in step S3.

Figure 7:
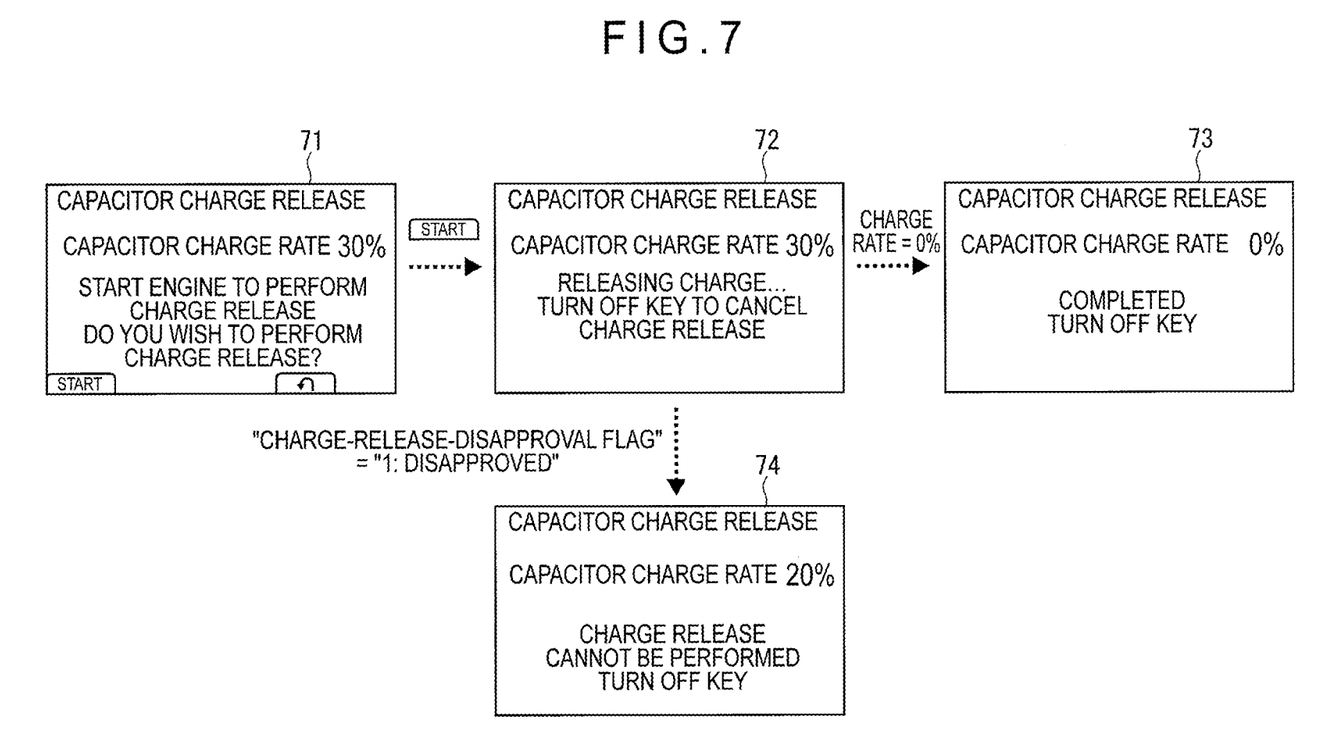
FIG. 7 shows an image transition diagram according to the charge-release-image displaying process.

On the other hands, in the case of "Yes" in step S3, the display controller 430 commands the display 461 to show a capacitor-charge-release-start image 71 as shown in FIG. 7 (step S4). The capacitor-charge-release-start image 71 as shown in FIG. 7 exemplarily shows that the capacitor charge rate is 30%.

Next, the charge-release-command detector 434 determines whether or not the serviceperson requests start of charge release by pressing a start button provided to the capacitor-charge-release-start image 71 (step S5). In the case of "No" in step S5, the charge-release-disapproval determiner 445 repeats the process back in step S4.

Charge-Release-Disapproval Determination Process

Figure 6:
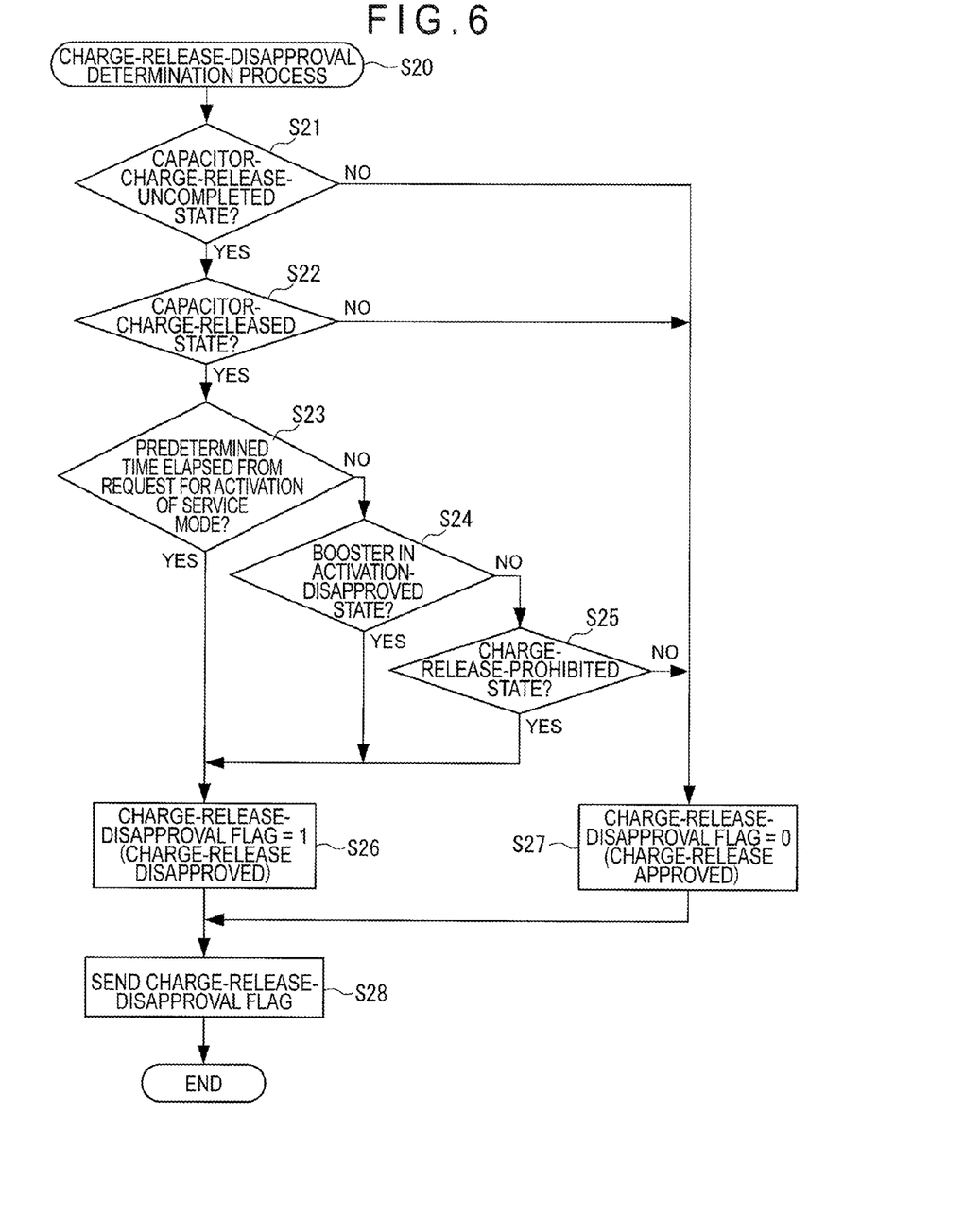
FIG. 6 is a flow chart showing a charge-release-disapproval determination process.

In the case of "Yes" in step S5, the charge-release-disapproval determiner 445 performs a charge-release-disapproval determination process S20 as shown in FIG. 6, and sends the determined charge-release-disapproval flag to the monitor controller 43.

Specifically, the charge-release-disapproval determiner 445 determines whether or not the control state of the booster 105 detected by the booster-control-state detector 441 is a "capacitor-charge-release-uncompleted state" (step S21).

In the case of "Yes" in step S21, the charge-release-disapproval determiner 445 determines whether or not a hybrid-control state detected by the hybrid-control-state detector 444 is a "capacitor-charge-released state" (step S22).

In the case of "Yes" in step S22, the charge-release-disapproval determiner 445 determines whether or not the timer 432, which started counting in step S2, has given a notification of the elapse of the service-mode-set time, i.e., whether or not the service-mode-set time elapsed since activation of the service mode was requested in step S1 (step S23).

Specifically, since the service-mode detector 431 sets the service-mode-flag at "0: not in service mode" in response to the notification of the elapse of the service-mode-set time from the timer 432 as described above, the charge-release-disapproval determiner 445 determines whether or not the service-mode-set time elapsed since activation of the service mode was requested by determining whether or not the service-mode flag sent from the service-mode detector 431 is set at "0" (i.e., "not in service mode").

In the case of "No" in step S23, the charge-release-disapproval determiner 445 determines whether or not the state of the booster 105 detected by the booster-activation-disapproved-state detector 442 is the "activation-disapproved state" (step S24).

In the case of "No" in step S24, the charge-release-disapproval determiner 445 determines whether or not a state detected by the charge-release-prohibited-state detector 443 is a "charge-release-prohibited state" (step S25).

In the case of "Yes" in any one of steps S23 to S25, the charge-release-disapproval determiner 445 sets the charge-release-disapproval flag at "1: charge release disapproved" (step S26). In other words, the result of the determination by the charge-release-disapproval determiner 445 is "Yes" in both steps S21 and S22 as long as the charge-release process is ongoing (i.e., for a duration of time from the start to the completion of the charge release). Therefore, in the case of "Yes" in at least one of steps S23 to S25 during the charge-release process, it is determined that conditions for disapproving charge release are satisfied. Incidentally, the charge-release-disapproval determiner 445 may set the charge-release disapproval flag at "1: charge release disapproved" not immediately after the conditions for disapproving charge release are satisfied but after the conditions for disapproving charge release are kept satisfied for a predetermined duration of time (e.g., one second). In this manner, for instance, even when the conditions for disapproving charge release are erroneously satisfied by a temporary malfunction or the like, erroneous determination can be prevented to reliably determine whether or not the conditions for disapproving charge release are satisfied.

On the other hand, in the case of "No" in step S21, "No" in step S22 and "No" in each of steps S23 to S25, the charge-release-disapproval determiner 445 sets the charge-release-disapproval flag at "0: charge-release approved" (step S27).

The charge-release-disapproval determiner 445 sends the charge-release-disapproval flag set in step S26 or S27 to the monitor controller 43 (step S28), and terminates the charge-release-disapproval determination process S20.

In short, the charge-release-disapproval determiner 445 determines that charge release is disapproved at least when: the charge-release process is being performed ("Yes" in steps S21 and S22); and the service-mode-set time elapsed since the service-mode flag was set at "0" (i.e., the set time elapsed since the service mode was started (i.e., since activation of the service mode was requested)) ("Yes" in step S23).

Charge-Release-Image Displaying Process

Figure 5:
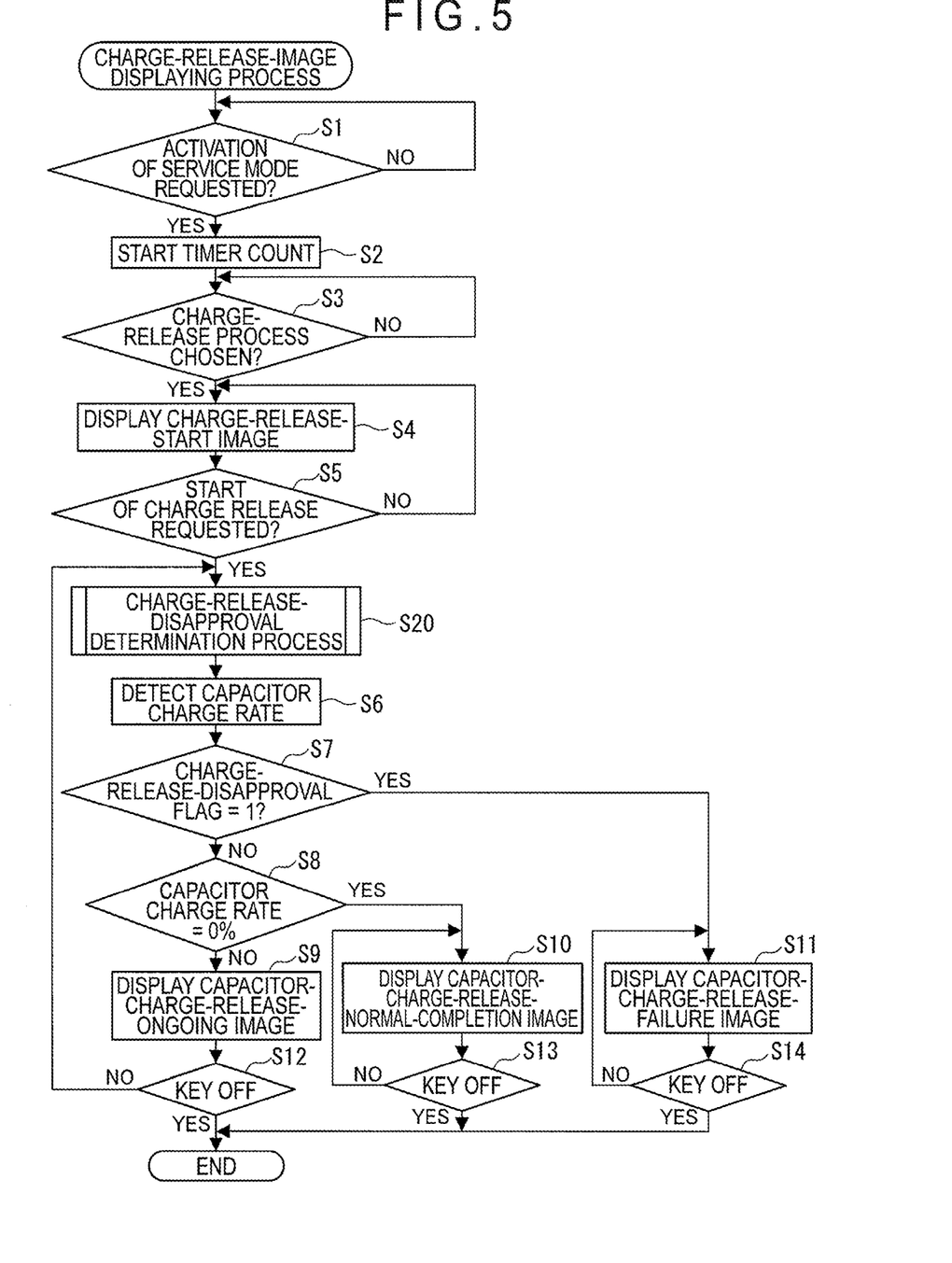
FIG. 5 is a flow chart showing a charge-release-image displaying process.

After completion of the charge-release-disapproval determination process S20 as shown in FIG. 6, the process returns to step S6 of the charge-release-image displaying process as shown in FIG. 5. The capacitor-charge-rate detector 446 then detects the charge rate of the capacitor 12, and sends it to the monitor controller 43 (step S6).

The display controller 430 determines whether or not the charge-release-disapproval flag determined by the charge-release-disapproval determiner 445 is "1: charge release disapproved" (step S7).

When the charge-release-disapproval flag is set at "0: charge release approved" ("No" in step S7), the display controller 430 determines whether or not the capacitor charge rate detected by the capacitor-charge-rate detector 446 is 0% (step S8).

When the capacitor charge rate is not 0% ("No" in step S8), the display controller 430 commands the display 461 of the monitor 46 to display a capacitor-charge-release-ongoing image 72 as shown in FIG. 7 (step S9).

The capacitor-charge-release-ongoing image 72 is designed to show: information that charge release is ongoing; the capacitor charge rate; and a message for informing that charge release is canceled by a key-off operation.

In the case of "Yes" in step SB (i.e., when it is determined that the capacitor charge rate is 0%), the display controller 430 commands the monitor 46 to display a capacitor-charge-release-normal-completion image 73 as shown in FIG. 7 (step S10).

The capacitor-charge-release-normal-completion image 73 is designed to show that: the charge release is completed; the capacitor charge rate is 0%; and the key-off operation is requested.

In contrast, in the case of "Yes" in step S7 (i.e. when the charge-release disapproval flag is set at "1: charge release disapproved" in the charge-release-disapproval determination process S20), the display controller 430 commands the monitor 46 to display a capacitor-charge-release-failure image 74 as shown in FIG. 7 (step S11). For instance, in the case of "Yes" in step S23 in FIG. 6 (i.e., when the charge-release process is ongoing at the elapse of the predetermined duration of time since the service mode was started (i.e., since activation of the service mode was requested), the charge-release-disapproval flag is set at "1: charge release disapproved" and the monitor 46 shows the capacitor-charge-release-failure image 74.

The capacitor-charge-release-failure image 74 is designed to show that: information that charge release cannot be performed; the capacitor charge rate at the time of failure in the charge release; and request for the key-off operation.

The display controller 430 determines whether or not the key-off operation is performed when any one of the images 72 to 74 is displayed (step S12, S13 or S14). In the case of "Yes" in any one of steps S12 to S14, the display controller 430 terminates the charge-release-image displaying process.

On the other hand, in the case of "No" in step S12, the process returns to the charge-release-disapproval determination process S20 and the display controller 430 repeats the processes in S6 to S20.

Otherwise, in the case of "No" in step S13 or S14, the process does not return to the charge-release-disapproval determination process S20, but the display controller 430 continues the displaying process in step S10 or S11. In other words, once the capacitor-charge-release-normal-completion image 73 or the capacitor-charge-release-failure image 74 is displayed, the image is kept displayed until the key-off operation is performed.

Image Transition

Figure 8:
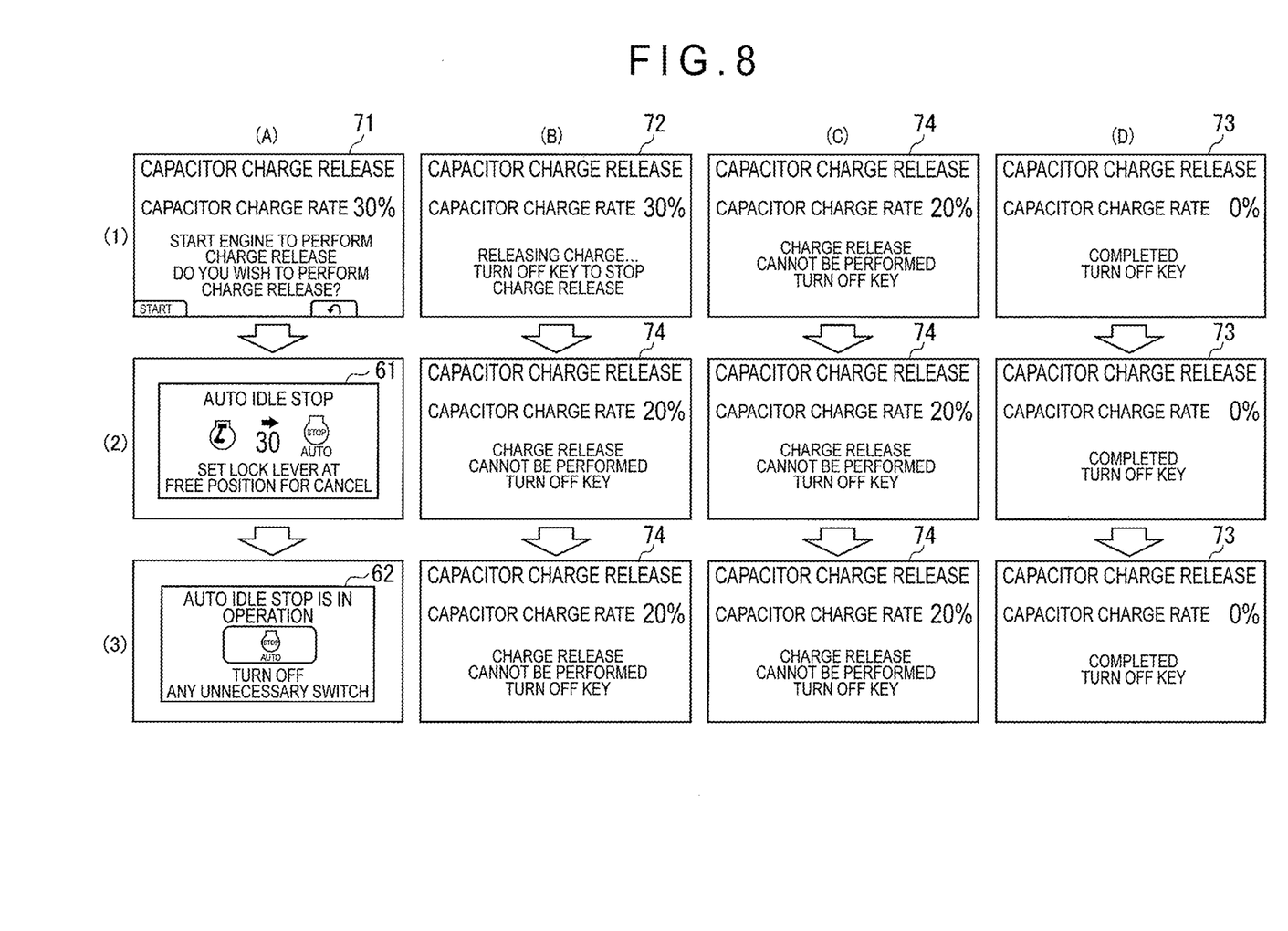
FIG. 8 shows another image transition diagram according to the charge-release-image displaying process.

FIG. 8 shows transition of the images shown by the display 461 of the monitor 46 through the above processes.

In FIG. 8, vertically aligned (1) to (3) stand for time course. Specifically, (1) includes images for a duration since the start of the service mode before the elapse of the predetermined duration of time, (2) includes images to be displayed at the elapse of the predetermined duration of time, and (3) includes images to be displayed when the engine 4 is stopped by AIS.

In FIG. 8, (A) to (D) each stand for time course in relation to charge release. Specifically, (A)-(1) to (A)-(3) relate to the case where auto idle stop is started before the start of the charge release process; (B)-(1) to (B)-(3) relate to the case where auto idle stop is started during charge release; (C)-(1) to (C)-(3) relate to the case where auto idle stop is started when charge release ends in failure (i.e., discontinuance), and (D)-(1) to (D)-(3) relate to the case where auto idle stop is started when charge release is completed (i.e., normal operation).

For instance, when (A) the charge release process is not yet started and (1) the predetermined duration of time does not elapse from the start of the service mode, the display controller 430 commands the display 461 of the monitor 46 to display the capacitor-charge-release-start image 71.

When (A) the charge release process is not yet started and (2) preset auto-stop conditions for the engine 4 are satisfied at the elapse of the predetermined duration of time from the start of the service mode, the display controller 430 commands the display 461 to display the time-to-AIS-showing image 61 that shows the time before the start of auto idle stop.

Further, when (A) the charge release process is not yet started and (3) the engine 4 is stopped as a result of AIS, the display controller 430 commands the display 461 to display the AIS-in-operation-showing image 62 that shows auto idle stop is ongoing.

Likewise, for (B)-(1), the display controller 430 commands the display 461 to display the capacitor-charge-release-ongoing image 72. For (B)-(2), the display controller 430 commands the display 461 to display the capacitor-charge-release-failure image 74. Further, for (B)-(3), the capacitor-charge-release-failure image 74 for (B)-(2) is kept displayed. In this manner, the capacitor-charge-release-failure image 74 is displayed at the elapse of the predetermined duration of time (i.e., (2)), thereby cautioning a serviceperson. Therefore, the serviceperson can appropriately prepare for a failure in charge release of the capacitor 12 during maintenance of the capacitor 12, the generator motor 5, the rotary-driving electric motor 11 or the like.

Likewise, for (C)-(1), since charge release ends in failure, the display controller 430 commands the display 461 to display the capacitor-charge-release-failure image 74. For (C)-(2) and (C)-(3), the capacitor-charge-release-failure image 74 for (C)-(1) is kept displayed. In this manner, when the charge release process is discontinued and ends in failure, the capacitor-charge-release-failure image 74 is kept displayed, thereby reliably informing a serviceperson of the state of charge release. Therefore, the serviceperson is cautioned to enhance safety in maintenance.

Likewise, for (D)-(1), since charge release ends in success, the display controller 430 commands the display 461 to display the capacitor-charge-release-normal-completion image 73. For (D)-(2) and (D)-(3), the capacitor-charge-release-normal-completion image 73 for (D)-(1) is kept displayed. In such a case, a serviceperson can be reliably informed of the state of charge release for the purpose of caution, thereby further enhancing safety in maintenance.

It should be understood that the scope of the invention is not limited to the above-described exemplary embodiment, but includes modifications and improvements as long as the modifications and improvements are compatible with the invention.

For instance, the determination conditions in the charge-release-disapproval determination process S20 may be different from those according to the above exemplary embodiment. In other words, any condition for disapproving charge release of the capacitor 12 may be included for determination.

Although the information-providing device that provides information on the charge release process for the capacitor 12

(i.e., electric storage device) is exemplified by the display 461, any substitute such as caution with lamp and buzzer may be employed as long as a serviceperson can be informed of a failure in the charge release process or the like.

In the hybrid hydraulic excavator 1 provided with the auto-idle-stop function, the charge-release-image displaying process is performed when AIS is set active in the above exemplary embodiment, the process may be performed irrespective whether or not AIS is set active. For instance, when the service mode is to be forcibly changed to the normal image at the elapse of a predetermined duration of time from the start of the service mode in order to prevent the service mode from being left activated irrespective of whether or not the auto-idle-stop function is provided, the charge-release-image displaying process may be performed. In such a case, for instance, when the charge-release process is ongoing at the elapse of the predetermined duration of time since the activation of the service mode was requested, the capacitor-charge-release-ongoing image 72 may be displayed to show that the charge-release process is ongoing, and when the charge-release process is successfully completed, the capacitor-charge-release-normal-completion image 73 may be displayed.

The invention is applicable not only to the hybrid hydraulic excavator 1 but also any hybrid work machine equipped with hybrid devices such as a generator motor and an electric storage device as well as an engine and a hydraulic mechanism.

The invention claimed is:

1. A hybrid work machine comprising:
    an engine;
    a generator motor;
    an electric storage device being configured to store electric power generated by the generator motor;
    a commanding system being configured to command at least activation of a service mode for maintenance and execution of a charge-release process for the electric storage device;
    an information-providing device being configured to provide at least information on the charge-release process for the electric storage device; and
    an information-providing controller being configured to control the information-providing device to provide the information, the information-providing controller commanding the information-providing device to provide the information when the charge-release process is ongoing at an elapse of a predetermined duration of time since the activation of the service mode was commanded by the commanding system.

2. The hybrid work machine according to claim 1, further comprising an auto-stop controller being configured to control auto-stop of the engine, wherein
    the auto-stop controller commands the auto-stop of the engine when a preset auto-stop condition is satisfied at the elapse of the predetermined duration of time since the activation of the service mode was commanded by the commanding system, and
    the information-providing controller commands the information-providing device: to provide the information comprising charge-release-failure information when the charge-release process is ongoing at the elapse of the predetermined duration of time since the activation of the service mode was commanded by the commanding system; and to continuously provide the charge-release-failure information even when the charge-release process is completed before the auto-stop of the engine is started.

3. The hybrid work machine according to claim 1, further comprising an auto-stop controller being configured to control auto-stop of the engine, wherein
    the auto-stop controller commands the auto-stop of the engine when a preset auto-stop condition is satisfied at the elapse of the predetermined duration of time since the activation of the service mode was commanded by the commanding system, and
    the information-providing controller commands the information-providing device: to provide the information comprising charge-release-normal-completion information when the charge-release process is completed before the elapse of the predetermined duration of time since the activation of the service mode was commanded by the commanding system; and to continuously provide the charge-release-normal-completion information after the predetermined duration of time elapses and the auto-stop of the engine is started.

4. The hybrid work machine according to claim 1, further comprising an auto-stop controller being configured to control auto-stop of the engine, wherein
    the auto-stop controller commands the auto-stop of the engine when a preset auto-stop condition is satisfied at the elapse of the predetermined duration of time since the activation of the service mode was commanded by the commanding system, and
    the information-providing controller commands the information-providing device: to provide the information comprising charge-release-failure information when the charge-release process ends in failure before the elapse of the predetermined duration of time since the activation of the service mode was commanded by the commanding system; and to continuously provide the charge-release-failure information after the predetermined duration of time elapses and the auto-stop of the engine is started.

5. A control method of providing information for a hybrid work machine, the hybrid work machine comprising:
    a generator motor;
    an electric storage device being configured to store electric power generated by the generator motor;
    a commanding system being configured to command at least activation of a service mode for maintenance and execution of a charge-release process for the electric storage device; and
    an information-providing device being configured to provide at least information on the charge-release process for the electric storage device, the method comprising commanding the information-providing device to provide the information when the charge-release process is ongoing at an elapse of a predetermined duration of time since the activation of the service mode was commanded by the commanding system.

6. The control method of providing the information for the hybrid work machine according to claim 5, further comprising:
    commanding auto-stop of an engine when a preset auto-stop condition is satisfied at the elapse of the predetermined duration of time since the activation of the service mode was commanded by the commanding system; and
    commanding the information-providing device: to provide the information comprising charge-release-failure information when the charge-release process is ongoing at the elapse of the predetermined duration of time since the activation of the service mode was commanded by the commanding system; and to continuously provide the charge-release-failure information even when the charge-release process is completed before the auto-stop of the engine is started.

* * * * *